(12) United States Patent
Fujimaru (10) Patent No.: US 7,926,380 B2
(45) Date of Patent: Apr. 19, 2011

(54) RESIN GEARS, DEVELOPING UNIT, PHOTOCONDUCTOR DRUM UNIT, IMAGE FORMING APPARATUS OR IMAGE READING APPARATUS HAVING THE SAME

(75) Inventor: Masahiro Fujimaru, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 1021 days.

(21) Appl. No.: 11/743,249

(22) Filed: May 2, 2007

(65) Prior Publication Data

US 2007/0283776 A1  Dec. 13, 2007

(30) Foreign Application Priority Data

May 17, 2006 (JP) .................. 2006-138336
May 19, 2006 (JP) .................. 2006-139736

(51) Int. Cl.
*F16H 55/00* (2006.01)
(52) U.S. Cl. ............... 74/462; 74/437; 74/457; 74/440
(58) Field of Classification Search .......... 74/437, 74/443, 457, 461, DIG. 10, 434, 460, 462, 74/440
See application file for complete search history.

(56) References Cited

U.S. PATENT DOCUMENTS

| | | | | |
|---|---|---|---|---|
| 612,840 A * | 10/1898 | Gleason | ............. | 74/460 |
| 885,194 A * | 4/1908 | Sponable | ............. | 74/462 |
| 1,408,568 A * | 3/1922 | De Freudenreich et al. | ... | 74/461 |
| 1,491,481 A * | 4/1924 | Huetter | ............. | 74/401 |
| 2,436,231 A * | 2/1948 | Schellens | ............. | 310/41 |
| 2,862,400 A * | 12/1958 | D'Angelo | ............. | 74/460 |
| 3,611,824 A * | 10/1971 | Stevens | ............. | 74/331 |
| 4,184,380 A * | 1/1980 | Rivin | ............. | 74/461 |
| 4,911,032 A | 3/1990 | Steele et al. | | |
| 4,944,196 A * | 7/1990 | Rivin | ............. | 74/443 |
| 5,595,090 A * | 1/1997 | Moribayashi | ............. | 74/462 |
| 5,852,951 A * | 12/1998 | Santi | ............. | 74/443 |
| 6,000,295 A | 12/1999 | Kimizuka | | |
| 6,230,578 B1 * | 5/2001 | Kim et al. | ............. | 74/462 |
| 6,752,035 B2 * | 6/2004 | Noguchi et al. | ............. | 74/461 |
| 7,258,037 B2 * | 8/2007 | Wiederrecht | ............. | 74/461 |
| 7,406,892 B2 * | 8/2008 | Takeuchi et al. | ............. | 74/440 |
| 7,633,837 B2 * | 12/2009 | Daout | ............. | 368/220 |
| 2002/0139211 A1 * | 10/2002 | Ishizuka et al. | ............. | 74/437 |
| 2005/0139029 A1 | 6/2005 | Fukizawa | | |

(Continued)

FOREIGN PATENT DOCUMENTS

JP          353118665 A   *   10/1978

(Continued)

OTHER PUBLICATIONS

Offical communication issued in counterpart Japanese Application No. 2006-138336, mailed on Apr. 15, 2008.

(Continued)

*Primary Examiner* — Richard W Ridley
*Assistant Examiner* — Matthew A Johnson
(74) *Attorney, Agent, or Firm* — Keating & Bennett, LLP (57) ABSTRACT

A resin gear has a plurality of teeth on an outer periphery thereof. One surface of each tooth has a tooth plane which meshes with another gear. The tooth thickness is substantially uniform from a tooth tip to a tooth root. A reinforcing rib is provided on the surface of each tooth on the opposite side from the tooth plane.

5 Claims, 12 Drawing Sheets

U.S. PATENT DOCUMENTS

| | | |
|---|---|---|
| 2005/0183531 A1 | 8/2005 | Hagihara et al. |
| 2005/0190002 A1 | 9/2005 | Takinami et al. |
| 2008/0022798 A1 * | 1/2008 | Zeise .................... 74/424.5 |

FOREIGN PATENT DOCUMENTS

| | | | |
|---|---|---|---|
| JP | 57-159057 A | | 3/1981 |
| JP | 01-210660 A | | 8/1989 |
| JP | 4-236848 A | | 8/1992 |
| JP | 408233071 A | * | 9/1996 |
| JP | 8-312755 A | | 11/1996 |
| JP | 10-122332 A | | 5/1998 |
| JP | 10-122337 A | | 5/1998 |
| JP | 10-196766 A | | 7/1998 |
| JP | 10-196767 A | | 7/1998 |
| JP | 2000-110919 A | | 4/2000 |
| JP | 2001-241536 A | | 9/2001 |
| JP | 2001-323991 A | | 11/2001 |
| JP | 2002-349674 A | | 12/2002 |
| JP | 2003-090412 A | | 3/2003 |
| JP | 2003-139219 A | | 5/2003 |
| JP | 2004-183873 A | | 7/2004 |
| JP | 2004-360923 A | | 12/2004 |
| JP | 2005-024952 A | | 1/2005 |
| JP | 2005-181697 A | | 7/2005 |
| JP | 2005-188573 A | | 7/2005 |
| JP | 2005-292634 A | | 10/2005 |

OTHER PUBLICATIONS

Official communication issued in counterpart Japanese Application No. 2006-138336, mailed on Nov. 18, 2008.

Official Communication issued in corresponding Japanese Patent Application No. 2006-139736, mailed on Sep. 14, 2010.

* cited by examiner

PRIOR ART

PRIOR ART

RESIN GEARS, DEVELOPING UNIT, PHOTOCONDUCTOR DRUM UNIT, IMAGE FORMING APPARATUS OR IMAGE READING APPARATUS HAVING THE SAME

BACKGROUND OF THE INVENTION

1. Field of the Invention

The present invention relates to resin gears applicable to a drive transmission mechanism in, for example, copying machines, facsimile machines, or printers. The present invention also relates to a developing unit, a photoconductor drum unit, an image forming apparatus or an image reading apparatus having the resin gears.

2. Description of the Related Art

In a drive transmission mechanism for various machines, such as a drive transmission mechanism for copying machines, facsimile machines, or printers, a drive force from a drive source such as a motor is transmitted via a gear. Such gears for drive transmission are manufactured by machining metal. However, gears formed of resin are used to take advantage of cost and weight reduction.

For example, in the first related art, the gear is formed with voids on both ends of the teeth in the direction of the width of the teeth for reducing the thickness of the teeth by a predetermined depth toward the direction of the width of the teeth, and the thickness of the teeth of portions in which the voids are formed is larger than portions without being formed with the voids considering the contraction difference after injection molding. In the second related art, when manufacturing resin worm wheels, the shape of the teeth is finished by cutting work after having molded a formed and molded member by a metal mold. In the third related art, a backlash-less gear formed of resin into a simple structure without increasing the width of the teeth is used.

Figure 5:
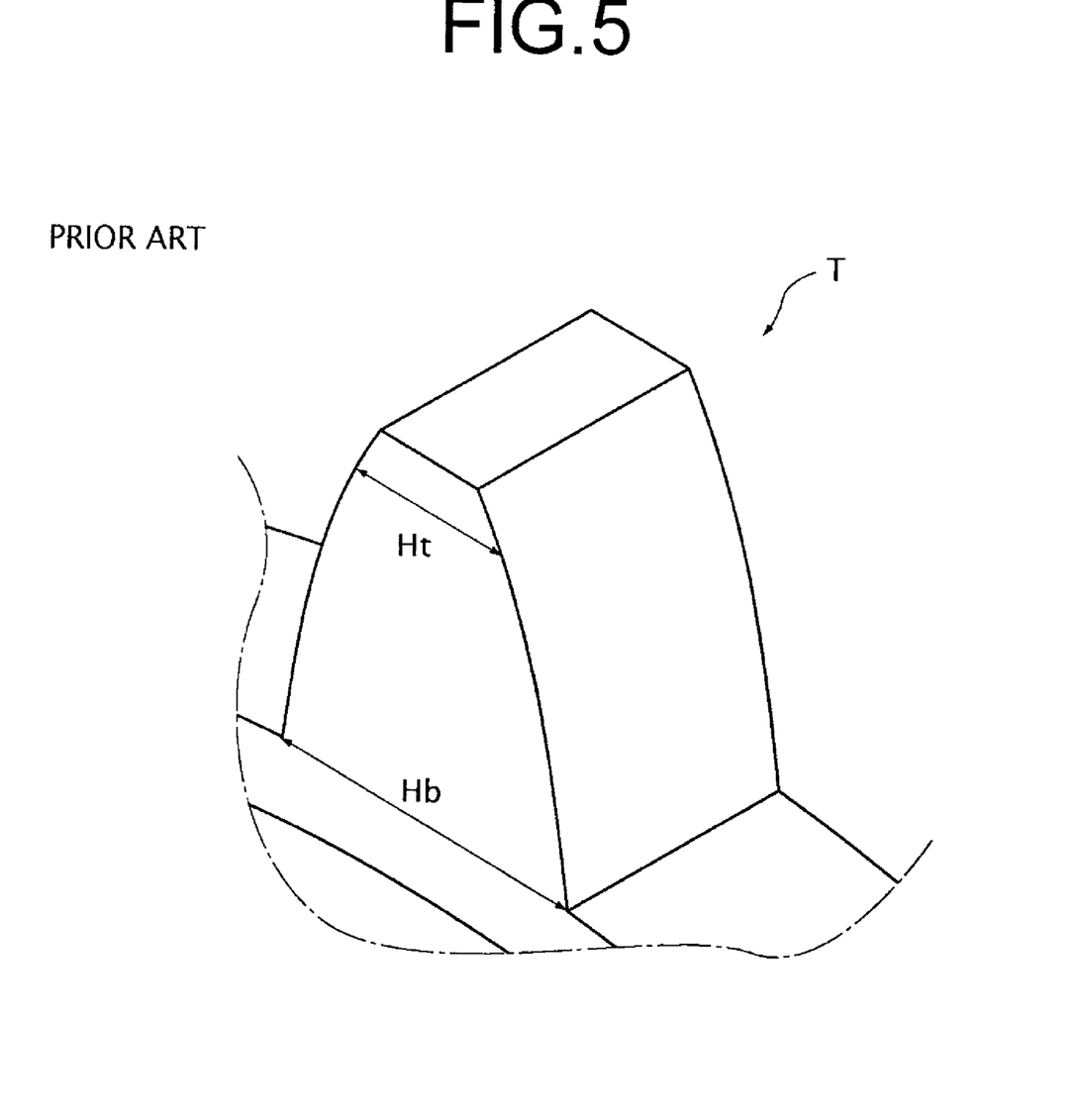
FIG. 5 is a partially enlarged perspective view of a tooth of a gear in the related art.

In the case of the resin gears in the related art, in the case of a spur wheel, for example, the tooth thickness Hb at a tooth root is larger than the tooth thickness Ht of a tooth tip of a tooth T as shown in FIG. 5. In a case of forming a resin molding process, when the thickness of the resin varies, a portion having a larger thickness has a larger contraction percentage when being cooled and cured, and hence there arises a problem in that the designed dimensions are not achieved due to uneven contraction of the entire gear.

In the fourth related art, a plurality of ribs are radially arranged at the roots of the teeth integrally with webs formed into a disc shape for securing necessary rigidity. In the fifth related art, teeth with a twisted teeth trace are formed on the outer peripheral side of an annular portion, and a plurality of reinforcing ribs are arranged radially on the inner side of the annular portion. In the sixth related art, a boss formed at a center portion, a rim formed concentrically with the boss in the outer peripheral direction, and a thin web connected integrally between the boss and the rim are provided, and the web is formed with ribs formed integrally and radially at positions corresponding to all the teeth.

Figure 10:
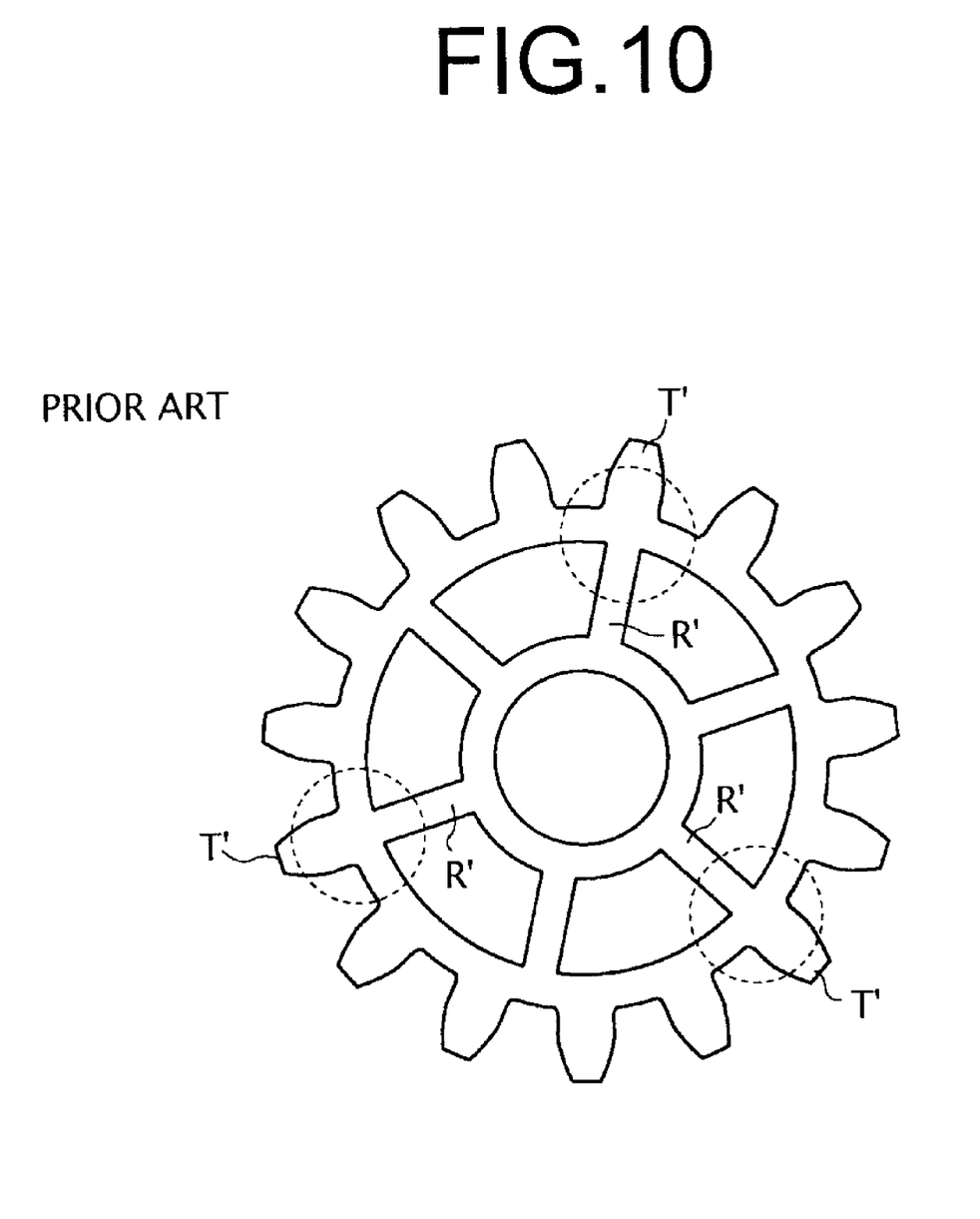
FIG. 10 is a front view of the gear in the related art.

The resin gear in the related arts as described above is provided with the plurality of radially formed reinforcing ribs on the inner side thereof, and in such a resin gear, reinforcing ribs R' are connected to, and integrally formed at, positions corresponding to tooth roots of teeth T' (portions surrounded with circles of dotted lines) as shown in FIG. 10. In this shape, resin portions having a larger thickness are formed continuously from the teeth T' to the reinforcing ribs R'. Therefore, when performing a resin molding process, since the contraction percentage of the resin portions having a larger thickness is larger, the entire gear is unevenly contracted when cooling and curing the resin, whereby the gear cannot be formed to have designed dimensions.

In particular, the gears used in the drive transmission mechanism for copying machines, facsimile machines or printers, when the dimensional accuracy is not high, may cause errors in a paper feeding operation or in an image forming process, so that deterioration of images occurs.

SUMMARY OF THE INVENTION

In order to overcome the problems described above, preferred embodiments of the present invention provide a resin gear in which the dimensional accuracy of the tooth planes of teeth is improved, and a developing unit, a photoconductor drum unit, an image forming apparatus or an image reading apparatus having the same.

A resin gear according to a preferred embodiment of the present invention is a resin gear formed with a plurality of teeth on an outer periphery thereof. One surface of each tooth is formed on a tooth plane which meshes with another gear, and the tooth thickness is substantially uniform from a tooth tip to a tooth root. Reinforcing ribs are formed on the opposite sides of the tooth surfaces of the respective teeth. Preferably, the reinforcing rib is formed at an approximate center of the tooth in the widthwise direction and is formed to have substantially the same thickness as the tooth thickness.

A developing unit, a photoconductor drum unit, an image forming apparatus or an image reading apparatus according to various preferred embodiments of the present invention is provided with the above-described resin gear.

In a resin gear according to preferred embodiments of the present invention having the configuration as described above, each tooth is formed with the tooth plane that meshes with another gear on one surface thereof, and has a substantially uniform tooth thickness from the tooth tip to the tooth root. Therefore, the tooth thickness of the gear is uniform, and hence, the occurrence of a contraction difference at the time of resin molding is reliably prevented. Accordingly, the dimensional accuracy of the tooth plane formed on one surface of the teeth may be improved. Since the reinforcing ribs are formed on the opposite sides of the tooth surfaces of the respective teeth, a decrease in the strength of the respective teeth is reliably prevented.

In general, when the gear is used, the gear is rotated only in one direction in many cases, and in such cases, the tooth plane may be formed only on the one surface of each tooth as in the case of the resin gear according to preferred embodiments of the present invention. Therefore, the tooth plane is not necessary on a surface opposite from the tooth plane. Focusing on this point, the tooth having a high degree of dimensional accuracy can easily be manufactured according to preferred embodiments of the present invention. Any decrease in the strength by reduction of the tooth thickness of the tooth roots in comparison with the related art is reliably prevented by the reinforcing ribs.

By setting the reinforcing ribs to have substantially the same thickness as the tooth thickness, generation of the contraction difference at the time of integrally molding the reinforcing ribs is reliably prevented, and hence, any influence of providing the reinforcing ribs to the tooth planes may be prevented. In addition, since the reinforcing ribs are located substantially at the center of the teeth in the widthwise direction, the reinforcing ribs act effectively to counter the pressure applied to the tooth planes. As a result, deformation of the tooth planes can be reliably prevented.

According to preferred embodiments of the present invention, a resin gear which is improved in dimensional accuracy in a case in which the reinforcing ribs are formed, and a developing unit, a photoconductor drum unit, an image forming apparatus, and an image reading apparatus provided with the same may be provided.

A resin gear according to preferred embodiments of the present invention is a resin gear formed integrally of resin material including an outer peripheral edge formed with a plurality of teeth on an outer peripheral surface at regular distances, a mounting hole formed at a center portion thereof, and a plurality of rib portions extending radially from the peripheral edge of the mounting hole and connected to the inner peripheral surface of the outer peripheral edge, wherein the rib portions are connected to the inner peripheral surface of the outer peripheral edge at positions corresponding to portions between the teeth. Preferably, the rib portions are formed to have substantially the same thickness as the thickness of the tooth roots of the teeth.

The developing unit, the photoconductor drum unit, the image forming apparatus and the image reading apparatus according to preferred embodiments of the present invention are provided with the above-described resin gears.

Since the resin gear according to preferred embodiments of the present invention, having the configuration as described above, is formed with the rib portions connected to the inner peripheral surface of the outer peripheral edge at the position corresponding to the portions between the teeth, the thick portions are not formed continuously from the rib portions to the teeth, and hence the occurrence of the contraction difference at the connected portions therebetween at the time of resin molding may be restrained and the dimensional accuracy over the entire gear can be improved.

By setting the thickness of the rib portions to be substantially the same thickness as the thickness of the tooth roots of the teeth, the rib portions contract at substantially the same contraction percentage as the contraction percentage of the teeth at the time of resin molding, so that the influence of the contraction of the rib portions to the dimensional accuracy of the teeth may be restrained.

Other features, elements, processes, steps, characteristics and advantages of the present invention will become more apparent from the following detailed description of preferred embodiment of the present invention with reference to the attached drawings.

DETAILED DESCRIPTION OF PREFERRED EMBODIMENTS

Preferred embodiments of the present invention will be described below in detail. Since the preferred embodiments described below are preferred embodiments for carrying out the present invention and hence various technical limitations are provided. However, the present invention is not limited to these preferred embodiments.

Figure 1:
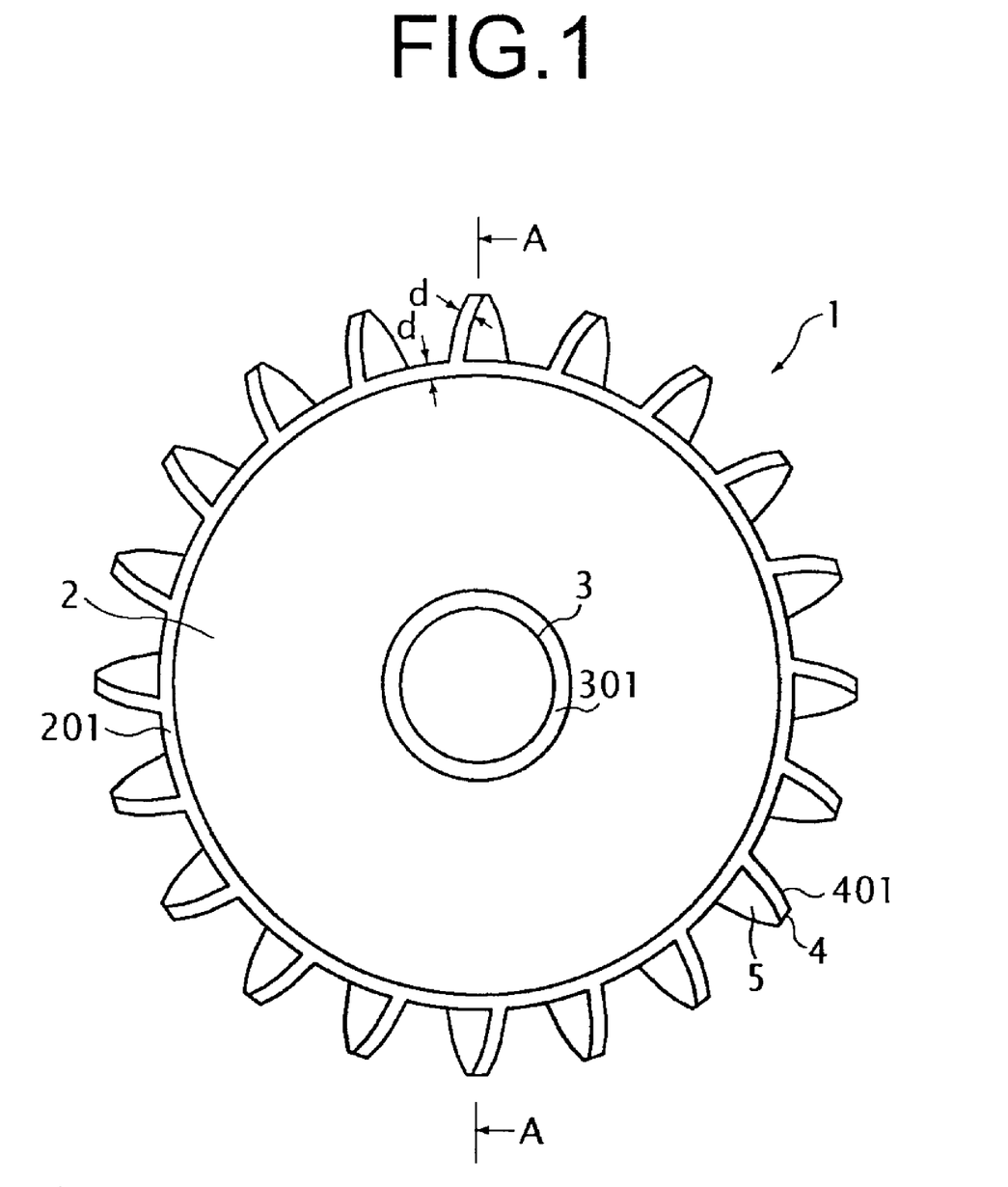
FIG. 1 is a front view of a resin gear according to a preferred embodiment of the present invention.
Figure 2:
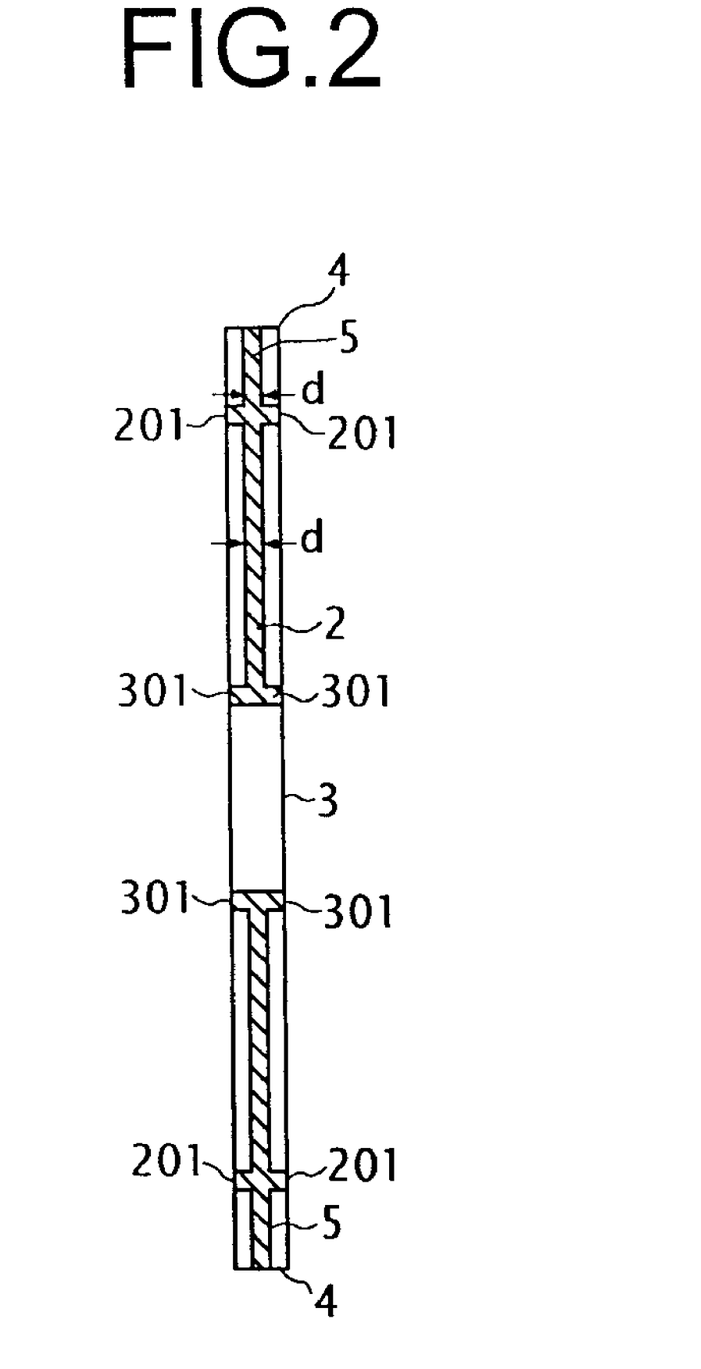
FIG. 2 is a cross-sectional view taken along the line A-A in FIG. 1.

FIG. 1 is a front view of a resin gear according to a preferred embodiment of the present invention, and FIG. 2 is a cross-sectional view taken along the line A-A in FIG. 1. A gear 1 is formed with a mounting hole 3 at a center portion of a disk-shaped gear body 2 for mounting a revolving shaft therethrough. The gear body 2 is formed with a plurality of teeth 4 on an outer periphery as regular distances. Each tooth 4 is formed with a tooth plane 401 on one surface thereof for meshing with another gear, and the tooth thickness is uniform from a tooth tip to a tooth root along the tooth plane 401. A reinforcing rib 5 is formed on a surface of the tooth 4 opposite from the tooth plane 401.

The gear body 2 is formed on the outer peripheral edge thereof with projecting edges 201 on both sides thereof along the entire circumference, and the width of the outer periphery of the gear body 2 including the projecting edges 201 is set to be the same as the width of the tooth 4. Projecting edges 301 are also provided on both sides of an outer periphery of the mounting hole 3.

As shown in FIG. 1, when the tooth thickness of the tooth 4 is represented by "d", the thickness of the reinforcing rib 5, the thickness of the gear body 2, and the thickness of the projecting edges 201 are set to be "d", and hence the respective portions of the gear 1 are substantially uniform.

In a case of manufacturing the gear 1 by a resin molding process, when heated and thus melted resin is filled into a metal mold having two metal mold halves tightly adhered together and then the filled resin is cooled and cured to mold, the resin is contracted to some extent in the course of curing. However, in the case of the gear 1, the thickness of the resin is substantially uniform at the respective portions, and hence the entire gear 1 is contracted uniformly, so that the gear 1 may easily be finished with the designed dimensional accuracy.

Figure 3:
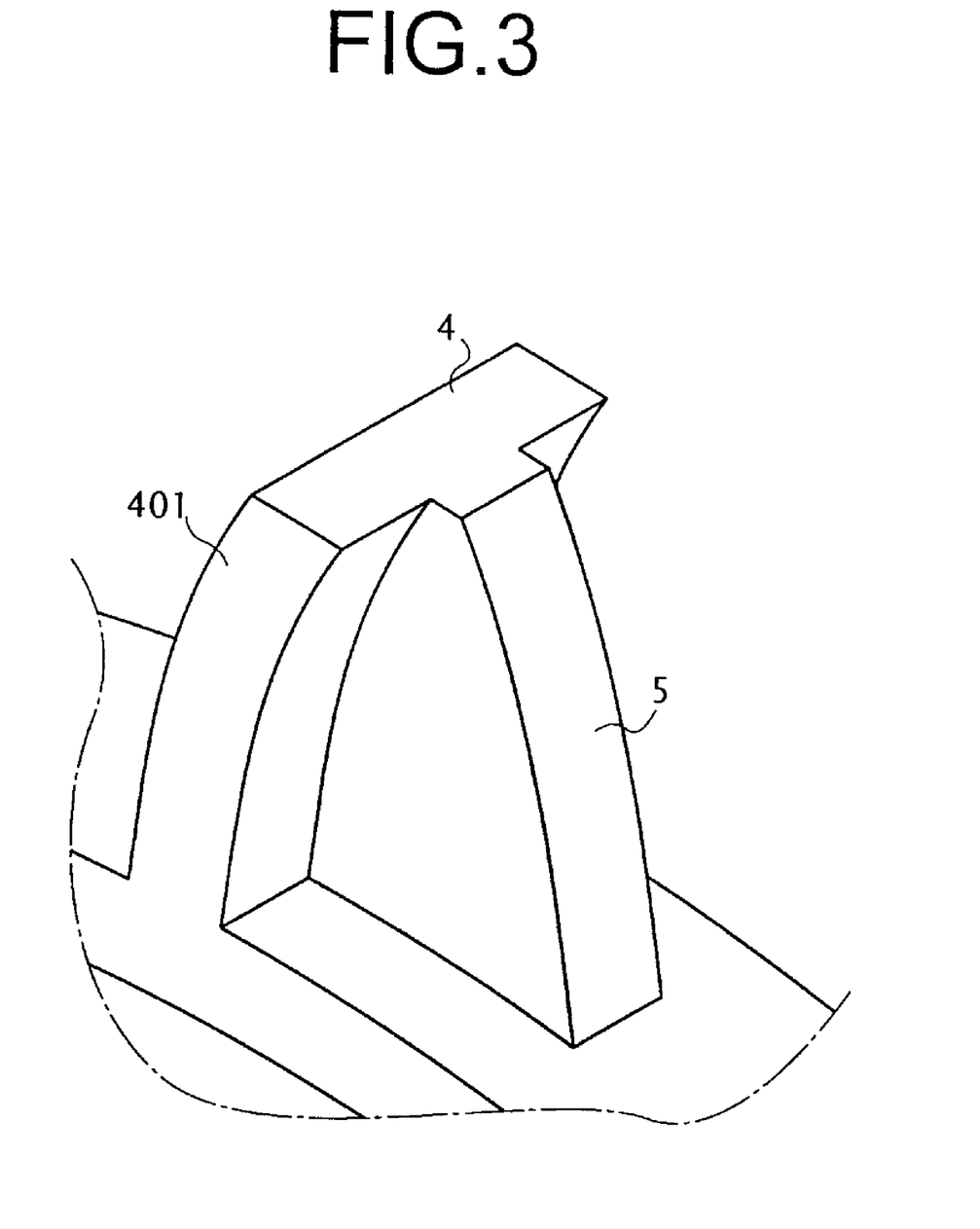
FIG. 3 is a partial enlarged perspective view of a tooth portion.

FIG. 3 is a partly enlarged perspective view of a part of the tooth 4. The tooth 4 has a predetermined width in the direction of the revolving shaft of the gear 1, and as described above, has a uniform tooth thickness from the tooth tip to the tooth root. The tooth 4 is formed with the tooth plane 401 on one surface side, and the reinforcing rib 5 on the opposite surface. The reinforcing rib 5 is formed integrally with the tooth 4 at the widthwise center thereof substantially perpendicularly to the widthwise direction. Therefore, when comparing with the teeth of the gear in the related art, it corresponds to provision of thickness reduction on both sides of the reinforcing rib 5, and hence the amount of resin material used for molding can be reduced correspondingly in comparison with the related art.

The shape of the reinforcing rib 5 may be any shape as long as it has a strength which can sufficiently resist a pressure applied to the tooth plane 401 when the gears mesh with each other. In this case, the thickness of the reinforcing rib 5 may be increased, and a plurality of the reinforcing ribs 5 may be provided so as to be juxtaposed to each other. Alternatively, the location of the reinforcing rib 5 may be set to a position other than the widthwise center against the pressure applied to the tooth plane 401.

What is essential is to set the tooth thickness of the tooth 4 from the tooth tip to the tooth root to be substantially the same, so that the contraction difference at the time of molding is made uniform, and the dimensional accuracy of the tooth plane 401 can be improved.

Figure 4:
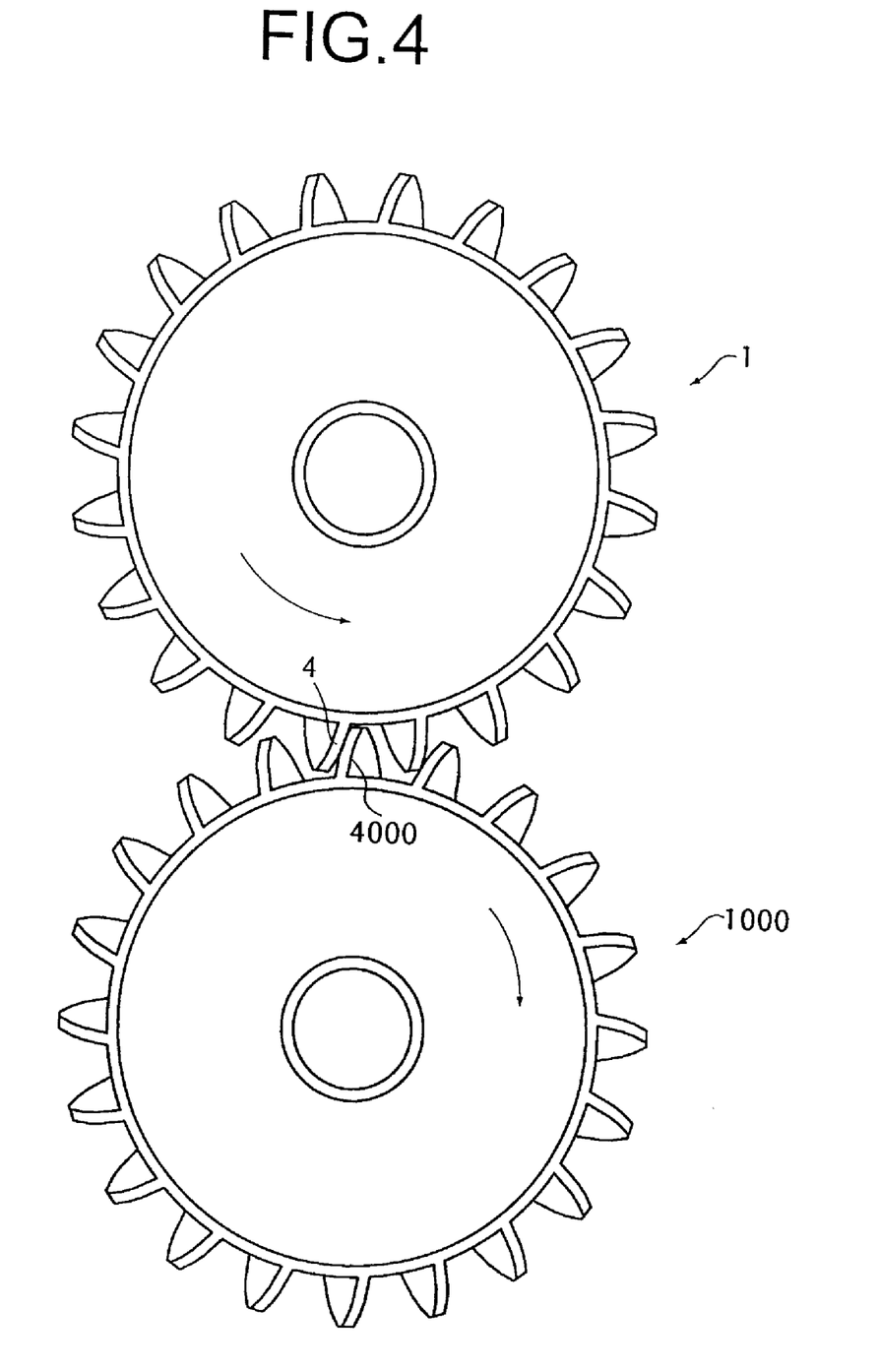
FIG. 4 is an explanatory drawing showing a state in which the resin gears are meshed with each other.

FIG. 4 is an explanatory drawing showing a state in which the gear 1 is meshed with a same gear 1000. When the gear 1 rotates counterclockwise, the gear 1000 is rotated clockwise in a state in which the tooth plane 401 of the tooth 4 comes into abutment with, and is meshed with, the tooth plane of a tooth 4000. Since the gear 1 rotates constantly counterclockwise, an action of drive transmission is performed only by the tooth plane 401 through meshing. Therefore, the surface on the opposite side from the tooth plane 401 is not used for the action of drive transmission, and hence the action of drive transmission is not impaired by the formation of the reinforcing rib 5.

Figure 6:
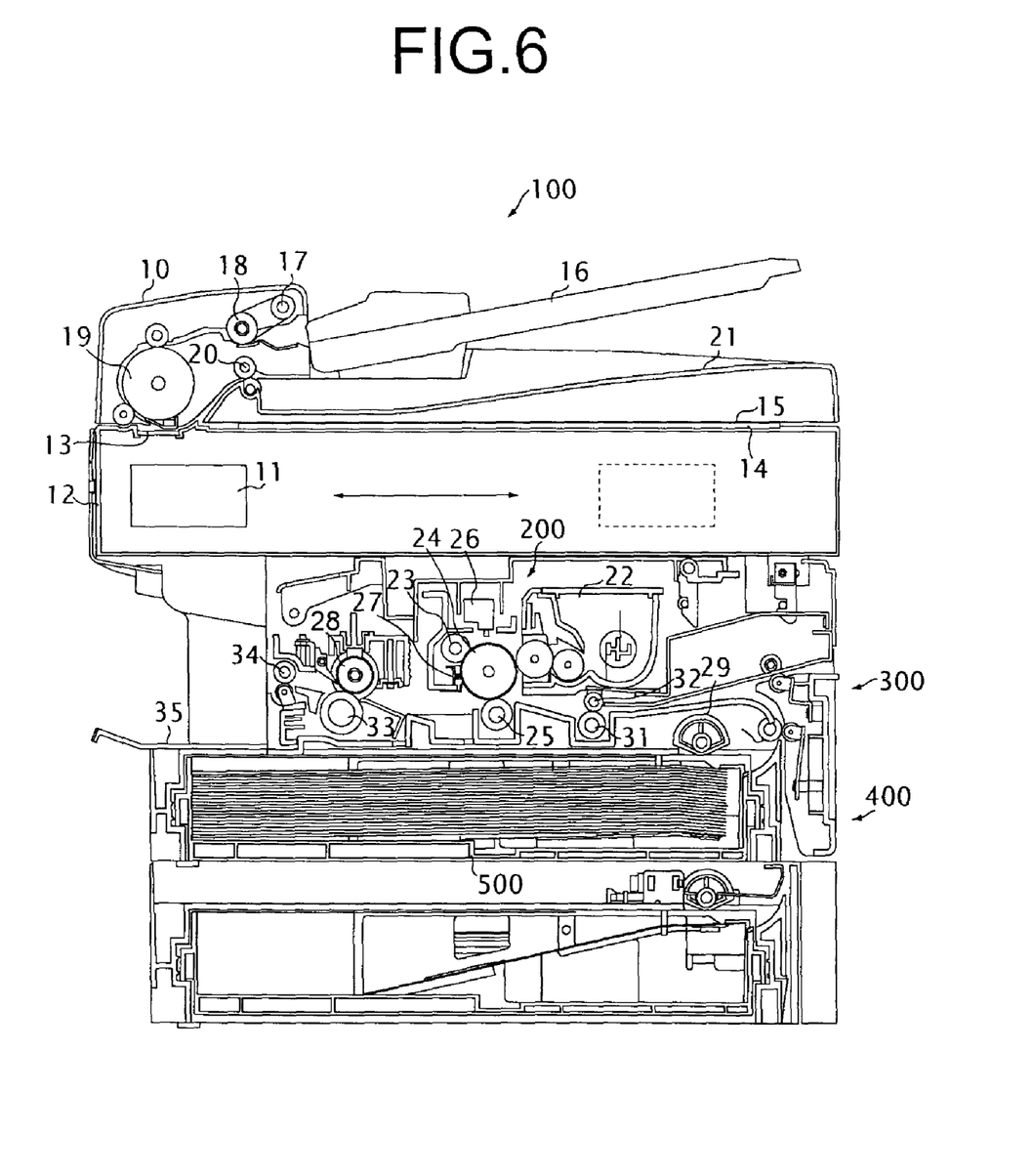
FIG. 6 schematically shows an entire image forming apparatus provided with the resin gear according to a preferred embodiment of the present invention.

FIG. 6 schematically shows an entire image forming apparatus provided with the resin gear according to another preferred embodiment of the present invention. A document reading unit 100 for carrying and reading documents is arranged on the top of the image forming apparatus, and a recording unit 200 configured to record images, a paper carrying unit 300 configured to carry paper sheets for recording the images thereon, and a paper feed unit 400 are disposed under the document reading unit 100.

The document reading unit 100 includes a cover member 10 having an automatic document feeder (ADF) provided therein and a reading main unit 12 provided with a scanner 11. Arranged on the upper surface of the reading main unit 12 is a platen glass 13 at a portion where the carried document is read, and a placing bed 14 formed of transparent glass member at a portion for placing the document or a book to read. When reading the carried document, the scanner 11 is maintained at a standstill at a position opposing the platen glass 13 for a reading operation, and when reading the document or the like placed on the placing bed 14, a plane of the document or the like to be read is scanned by the scanner 11 for the reading operation.

The surface of the cover member 10 opposing the placing bed 14 is provided with a document holder 15, and a document tray 16 for placing a plurality of documents is provided above the document holder 15. The documents placed in the document tray 16 are carried into the ADF by a pickup roller 17 and a separation roller 18, carried to a reading position opposing the platen glass 13 by a feed roller 19, read by the scanner 11, and discharged to a document discharge tray 21 by a discharge roller 20.

The recording unit 200 includes a developing unit 22, a charging brush 23, a photoconductor drum 24, a transfer roller 25, an exposure head 26, a memory removing brush 27, and a fixing roller 28 for recording on the paper sheet carried by the paper carrying unit 300. Firstly, the surface of the photoconductor drum 24 is charged uniformly by the charging brush 23, and the surface of the charged photoconductor drum 24 is exposed by the exposure head 26 according to image recording signals to form an electrostatic latent image. Subsequently, toner in the developing unit 22 is transferred to the electrostatic latent image formed on the photoconductor drum 24 by a feed roller and a developing roller to visualize the image, and a toner image formed on the surface of the photoconductor drum 24 is transferred to the paper sheet by the transfer roller 25. The transferred toner image is fixed to the paper sheet by being heated and pressed by the fixing roller 28.

In this manner, a series of processing including charging the photoconductor, exposing, developing, transferring and fixing to the paper sheet is executed so that the image formation on the paper sheet is achieved. The toner remaining on the surface of the photoconductor drum 24 after transfer is weakened in adhesion force by the memory removing brush (ERS brush) 27, and is dispersed on the surface of the photoconductor drum 24. The remaining toner is collected by the developing roller of the developing unit 22.

In the paper feed unit 400, a plurality of the paper sheets are set in a paper feed cassette 500 in stack, and are fed one by one to the paper carrying unit 300 by a paper feed roller 29. The fed paper sheet is carried by a feed roller 30 and nipped by feed rollers 31 and 32. Then, the paper sheet is carried by the feed roller 31 to the recording unit 200, is formed with an image thereon, and the paper sheet applied with the image forming process is nipped between the fixing roller 28 and a press roller 33, where a fixing process is performed, and is carried out to a paper discharge tray 35 by a paper discharge roller 34.

The developing roller and the feed roller of the developing unit 22 are supported on the frame of the developing unit 22 via roller shafts, and are rotated by a drive force transmitted from a drive motor, not shown, via gears fixed to the ends of the roller shafts. Since the developing roller and the feed roller rotate always in one direction, and hence the above-described resin gears are used for rotating such roller shafts. Usage of the resin gears according to preferred embodiments of the present invention achieves accurate control of rotation, and contributes to weight reduction of the developing unit.

The photoconductor drum 24, the exposure head 26, and the memory removing brush 27 are preferably unitized and configure a unit of the photoconductor drum unit. The photoconductor drum 24 is supported by the frame of the unit via a drum shaft, and is configured to rotate by being transmitted with a drive force from the drive motor, not shown, via a gear fixed at the end of the drum shaft. Since the photoconductor drum 24 always rotates in one direction, the above-described resin gear is used for rotating these members. Usage of the resin gears according to preferred embodiments of the present invention achieves accurate control of rotation, and contributes to weight reduction of the photoconductor drum unit.

The feed rollers 30 and 31, and the paper discharge roller 34 for carrying the paper sheets are supported by the frame of an apparatus body via the roller shafts, and are rotated by a drive force transmitted from the drive motor, not shown, via the gears fixed to the ends of the respective roller shafts. These rollers always rotate in one direction, and hence the above-described resin gears are used for rotating the same. Usage of the resin gears according to preferred embodiments of the present invention achieves accurate control of rotation, and contributes to weight reduction of the image forming apparatus.

Figure 7:
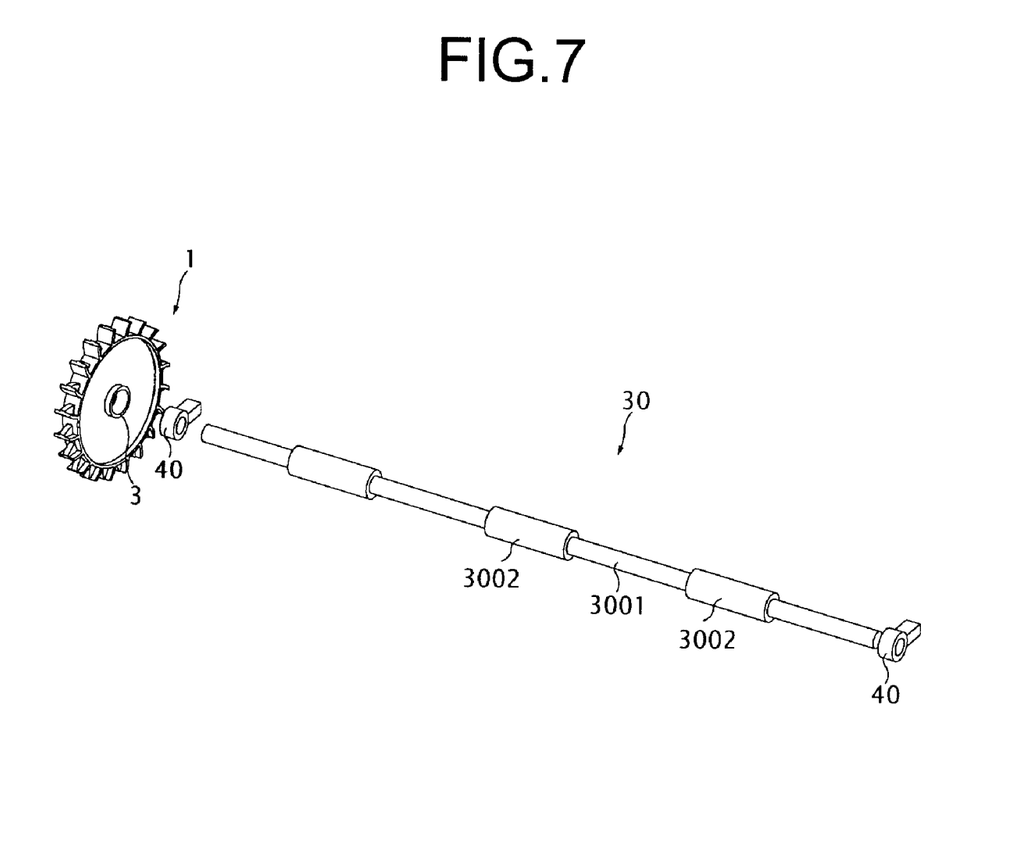
FIG. 7 is a perspective view of a feed roller which the resin gear is applied.

FIG. 7 is a perspective view showing an example in which the resin gear 1 according to a preferred embodiment of the present invention is applied to the feed roller 30. The feed roller 30 is provided with a plurality of rollers 3002 secured on a roller shaft 3001, and the both ends of the roller shaft 3001 are attached to the frame via supporting members 40. The resin gear 1 is fitted and fixed to one end of the roller shaft 3001 through the mounting hole 3.

In the document reading unit 100, the feed roller 19 of the ADF is supported by the frame of the document reading unit 100 via the roller shafts and is rotated by a drive force transmitted from the drive motor, not shown, via a gear fixed to an end of the roller shaft. Since the feed roller 19 always rotates in one direction, and hence the above-described resin gears are used for rotating the same. Usage of the resin gears according to preferred embodiments of the present invention achieves accurate control of rotation, and contributes to weight reduction of the document reading unit.

Figure 8:
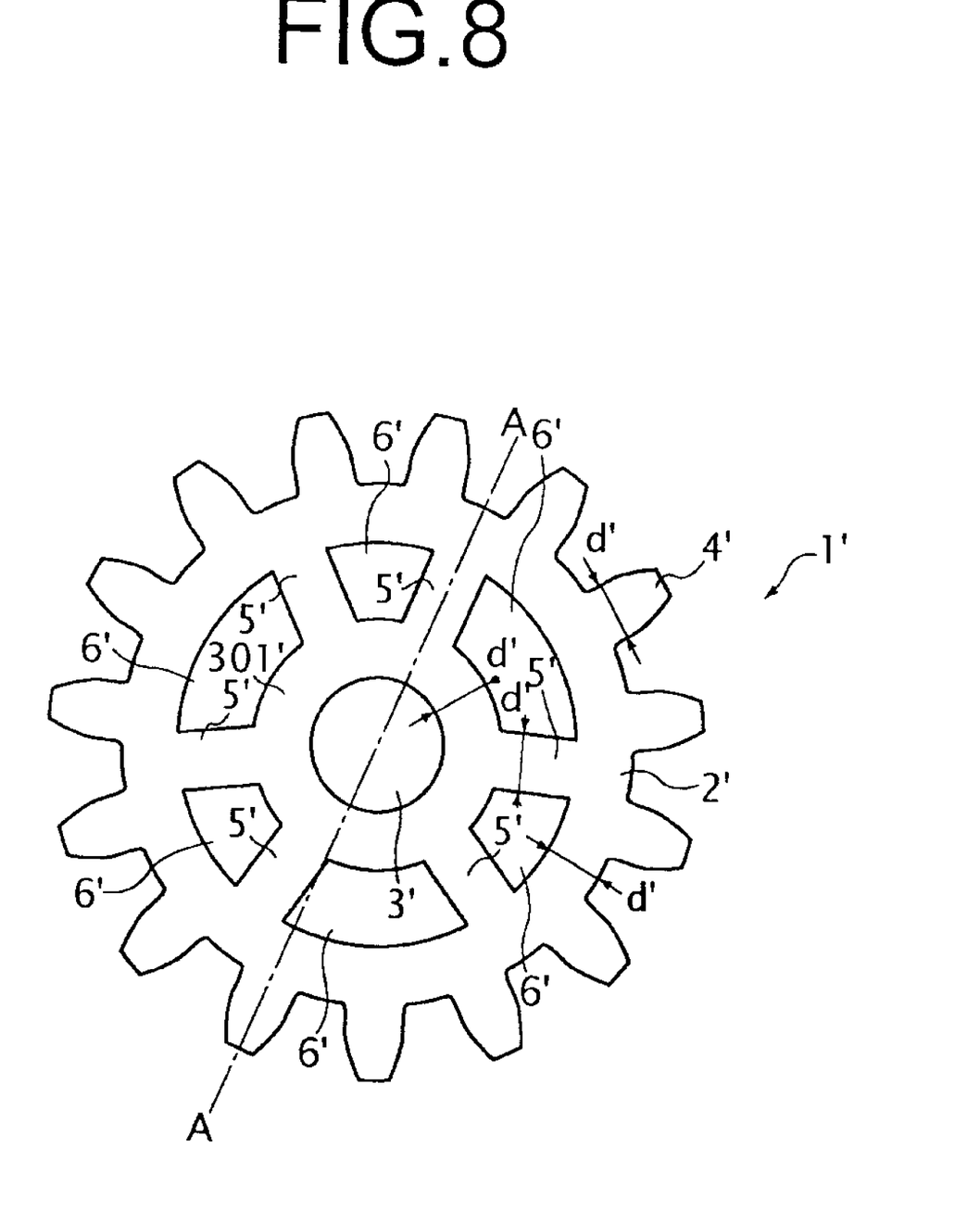
FIG. 8 is a front view of the resin gear according to a preferred embodiment of the present invention.
Figure 9:
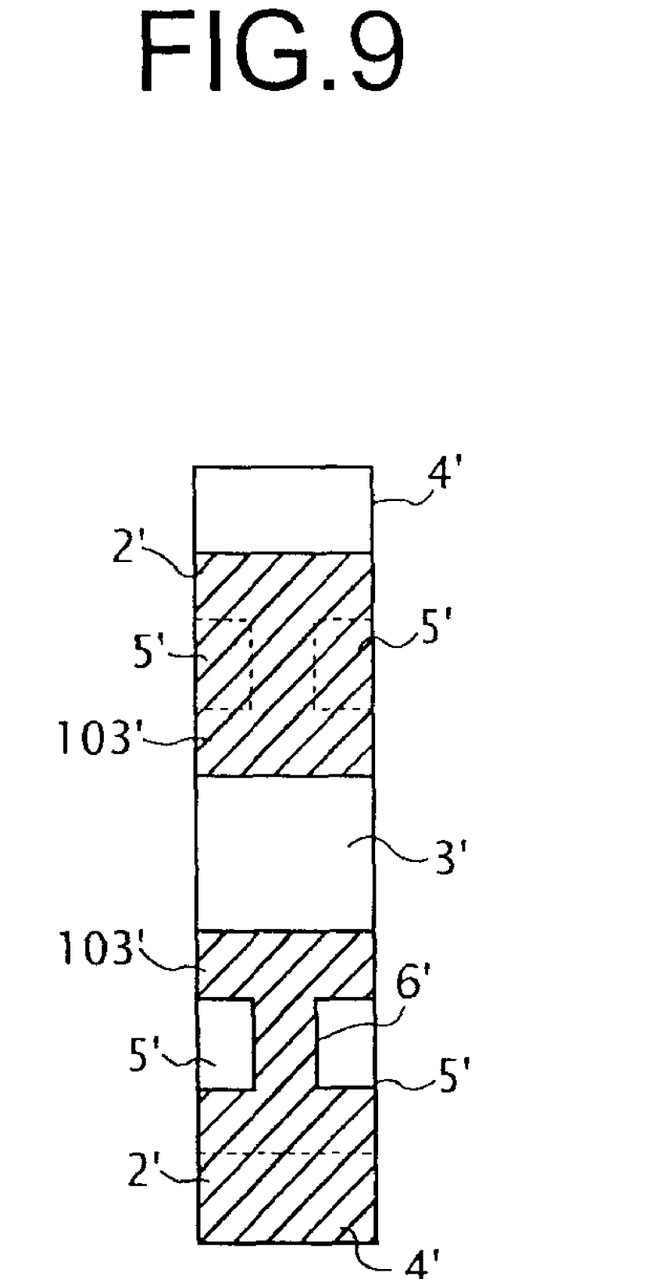
FIG. 9 is a cross-sectional view taken along the line A-A in FIG. 8.

FIG. 8 is a front view of the resin gear according to a preferred embodiment of the present invention, and FIG. 9 is a cross-sectional view taken along the line A-A in FIG. 8. A gear 1' is formed with a mounting hole 3' at a center portion thereof for mounting a revolving shaft therethrough, and is provided with an outer peripheral edge 2' formed concentrically with the mounting hole 3'. The outer peripheral surface of the outer peripheral edge 2' is formed with a plurality of teeth 4' at regular distances.

The peripheral edge of the mounting holes 3' is formed with projecting edges 301' and a plurality of rib portions 5' extending radially from the outer peripheral surface of the projecting edges 301' are connected integrally to the inner peripheral surface of the outer peripheral edge 2'. The connected portions of the rib portions 5' to the outer peripheral edge 2' are set to positions corresponding to portions between the teeth 4', so that thick portions are not formed continuously from the teeth 4' to the rib portions 5'. Formed between the rib portions 5' are thickness reduced portions 6' formed into a thin profile, so that weight reduction is achieved. With the formation of the plurality of radial rib portions 5', the overall rigidity of the gear 1' is secured while reducing the weight.

The outer peripheral width d' of the outer peripheral edge 2' is set to be the same as the tooth thickness d' of the tooth roots of the teeth 4', and in the same manner, the width d' of the rib portions 5' and the width d' of the projecting edge 301' are set to be the same as the tooth thickness d' of the tooth roots of the teeth 4'. The thickness of the thickness reduced portions 6' is also set to be the same as the tooth thickness d', so that the thickness of the respective portions of the entire gear 1' is uniform, and the contraction difference over the entire gear at the time of molding is reduced, and hence the dimensional accuracy of the entire gear can be improved.

In a case of manufacturing the gear 1' by a resin molding process, when heated and thus melted resin is filled into a metal mold having two metal mold halves tightly adhered together and then the filled resin is cooled and cured to mold, the resin is contracted to some extent in the course of curing. However, in the case of the gear 1', the thickness of the resin is substantially uniform at the respective portions, and hence the entire gear 1' is contracted uniformly, so that the gear 1' may easily be finished with the designed dimensional accuracy.

Figure 11:
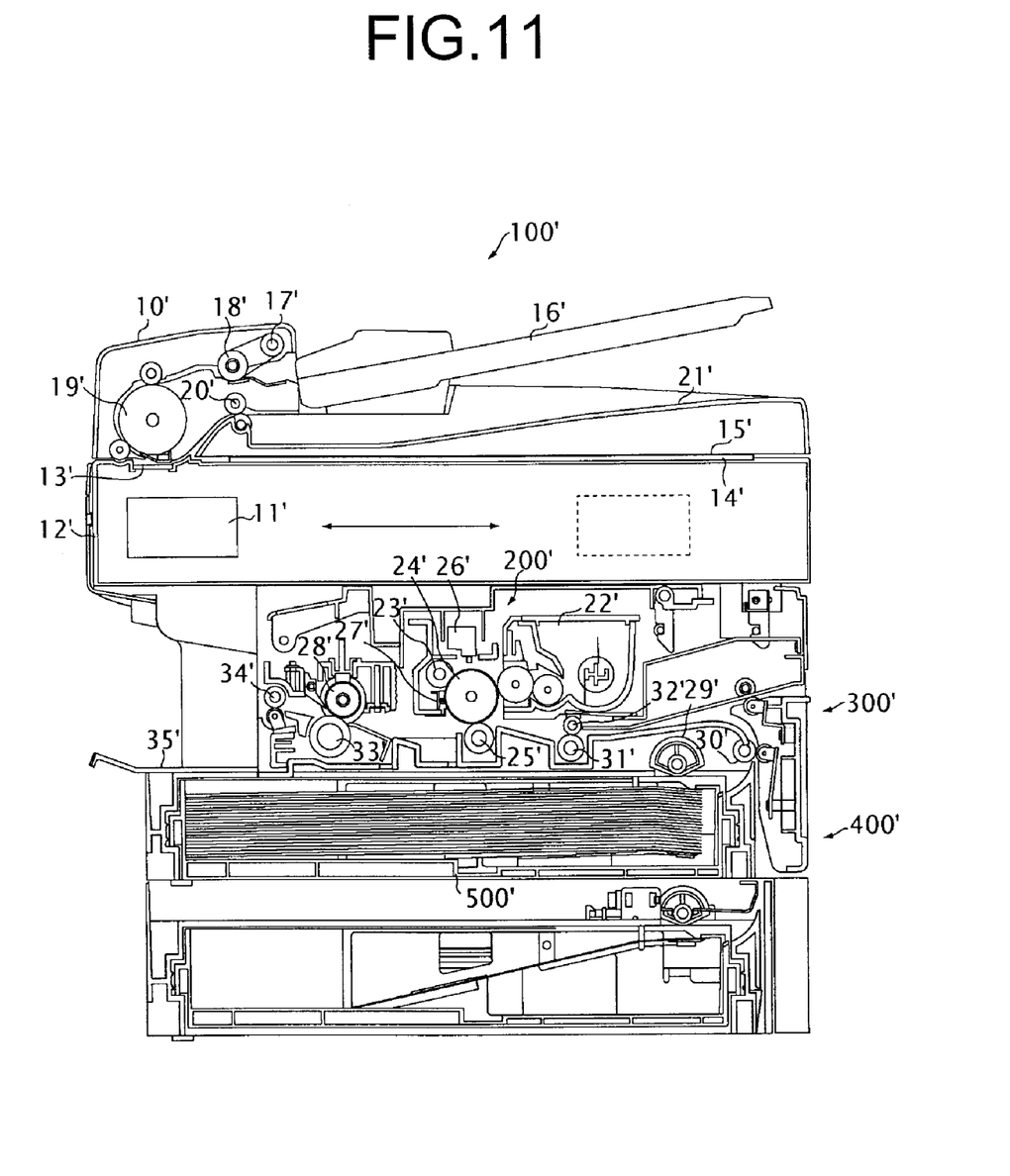
FIG. 11 is a schematic drawing of an entire image forming apparatus provided with the resin gear according to a preferred embodiment of the present invention.

FIG. 11 is a schematic drawing of an entire image forming apparatus provided with the resin gear 1' according to a preferred embodiment of the present invention. Since the configuration is preferably the same as the configuration shown in FIG. 6 described above in most part, detailed description will be omitted.

Figure 12:
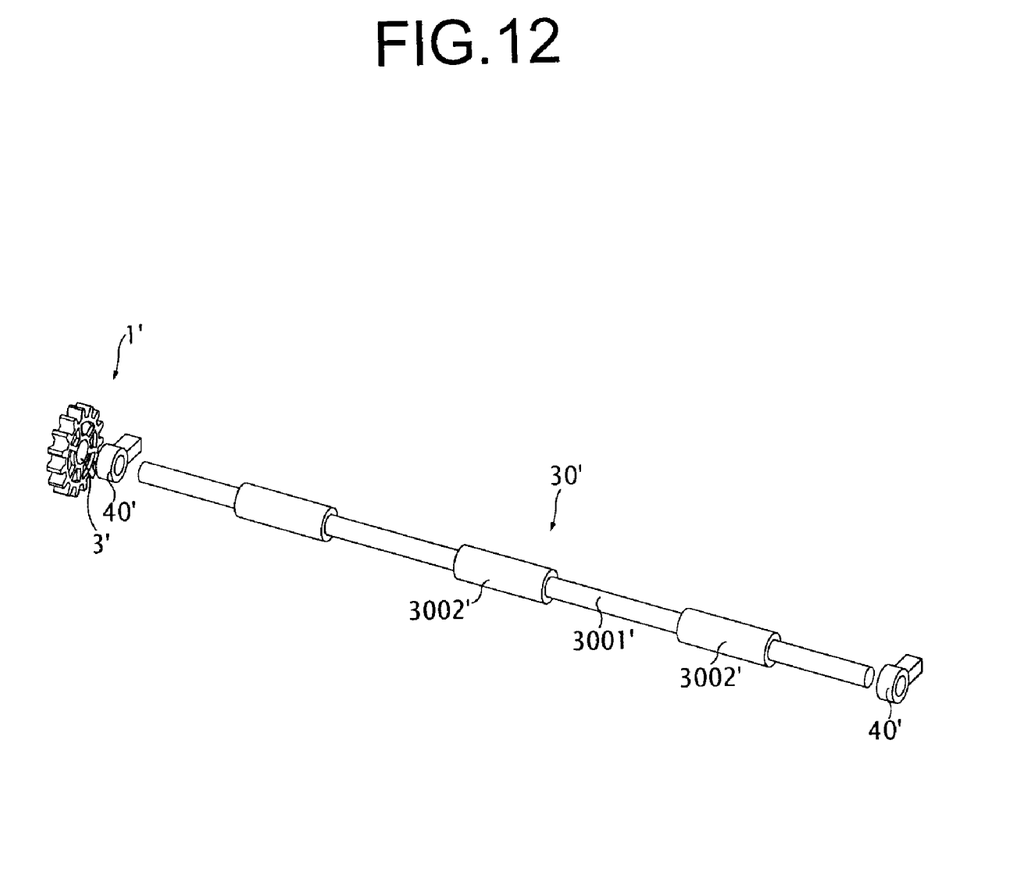
FIG. 12 is a perspective view of a feed roller to which the resin gear is applied.

FIG. 12 is a perspective view of an example in which the resin gear 1' according to a preferred embodiment of the present invention is applied to a feed roller 30'. Since the configuration is the same as the configuration shown in FIG. 7 described above in most part, detailed description will be omitted.

In the examples described above, a spur wheel has been described. However, the present invention is also applicable to the resin gears other than the spur wheel.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A resin gear comprising:
   a gear body including projecting edges extending from both sides of an outer peripheral edge of the gear body along substantially an entire circumference of the gear body;
   a plurality of teeth provided on the outer peripheral edge of the gear body; wherein
   one surface of each of the plurality of teeth includes a tooth plane that is arranged to mesh with another gear, a thickness of each of the plurality of teeth is substantially uniform from a tooth tip to a tooth root;
   a reinforcing rib is located on a surface of each of the plurality of teeth on an opposite side from the tooth plane;
   the reinforcing rib is located at an approximate center of each of the plurality of teeth in a widthwise direction of each of the plurality of teeth extending perpendicular or substantially perpendicular to the outer peripheral edge of the gear body;
   thicknesses of the reinforcing rib and the projecting edges are substantially the same as the thickness of each of the plurality of teeth;
   the thickness of each of the plurality of teeth is defined by a dimension of each of the plurality of teeth extending along the outer peripheral edge of the gear body;
   the thickness of the reinforcing rib is defined by a dimension of the reinforcing rib extending in the widthwise direction of each of the plurality of teeth; and
   the thickness of the projecting edges is defined by a dimension of the projecting edges extending in a radial direction of the gear body.

2. A developing unit comprising the resin gear according to claim 1.

3. A photoconductor drum unit comprising the resin gear according to claim 1.

4. An image forming apparatus comprising the resin gear according to claim 1.

5. An image reading apparatus comprising the resin gear according to claim 1.

* * * * *